(12) United States Patent
Nicholson

(10) Patent No.: US 11,572,229 B2
(45) Date of Patent: Feb. 7, 2023

(54) SILO GUARD

(71) Applicant: Adams Silo Safe & Welding Pty Ltd, Victoria (AU)

(72) Inventor: Adam James Nicholson, Victoria (AU)

(73) Assignee: Adams Silo Safe & Welding Pty Ltd, Victoria (AU)

( * ) Notice: Subject to any disclaimer, the term of this patent is extended or adjusted under 35 U.S.C. 154(b) by 0 days.

(21) Appl. No.: 17/305,794

(22) Filed: Jul. 14, 2021

(65) Prior Publication Data

US 2021/0362943 A1 Nov. 25, 2021

Related U.S. Application Data

(63) Continuation of application No. PCT/AU2020/050019, filed on Jan. 15, 2020.

(30) Foreign Application Priority Data

Jan. 15, 2019 (AU) .................................. 2019100045

(51) Int. Cl.
*B65D 88/66* (2006.01)
*A01F 25/20* (2006.01)

(52) U.S. Cl.
CPC .......... *B65D 88/66* (2013.01); *A01F 25/2018* (2013.01)

(58) Field of Classification Search
CPC ........ B65D 88/66; B65D 90/22; B65D 88/08; B65D 2588/64; A01F 25/2018; A01F 25/14

See application file for complete search history.

(56) References Cited

U.S. PATENT DOCUMENTS

| | | | | | |
|---|---|---|---|---|---|
| 3,257,040 | A | * | 6/1966 | Dumbaugh | B65D 88/66 222/161 |
| 3,700,145 | A | * | 10/1972 | Schluter | B65D 88/66 222/202 |
| 3,933,281 | A | * | 1/1976 | Uralli | B65D 88/66 222/234 |
| 4,365,698 | A | * | 12/1982 | Godwin | B65D 88/66 193/2 B |
| 4,383,766 | A | * | 5/1983 | Eriksson | B65D 88/66 222/203 |
| 4,470,525 | A | * | 9/1984 | Daw | B65D 88/66 222/200 |
| 4,526,121 | A | * | 7/1985 | Shudo | B65D 88/66 210/384 |
| 5,395,058 | A | * | 3/1995 | Doyle | B65D 88/66 241/73 |

(Continued)

FOREIGN PATENT DOCUMENTS

| CN | 206766785 | 12/2017 |
|---|---|---|
| WO | WO 2020/146924 | 7/2020 |

*Primary Examiner* — Donnell A Long
(74) *Attorney, Agent, or Firm* — Levine Bagade Han LLP

(57) ABSTRACT

The invention is directed broadly to a filter for a bin storing agricultural material, the filter comprising; a rigid perimeter frame supporting a grate within the frame; and a plurality of legs spaced about the perimeter frame, wherein the filter, in use, is located within the bin and positioned to substantially cover an outlet of the bin, the plurality of legs in direct contact with the bin so as to transmit vibrations from the bin to the filter, the agricultural material within the bin traversing the grate as it exits the bin.

16 Claims, 12 Drawing Sheets

(56) References Cited

U.S. PATENT DOCUMENTS

| | | | |
|---|---|---|---|
| 5,975,447 A | 11/1999 | Brusseau | |
| 2004/0153262 A1* | 8/2004 | Crowder | A61M 15/0003 |
| | | | 702/56 |
| 2008/0197151 A1* | 8/2008 | Leblond | B65D 88/26 |
| | | | 222/196 |
| 2011/0000885 A1* | 1/2011 | Kenealy | B65D 25/20 |
| | | | 147/35.5 |

* cited by examiner

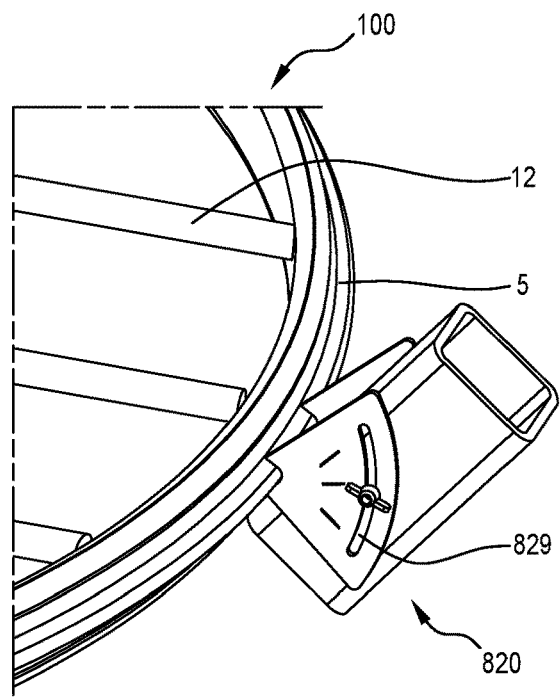
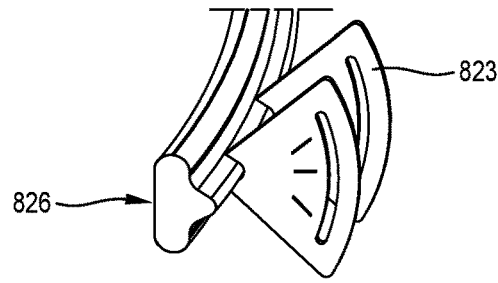
FIG. 12 A
FIG. 12B
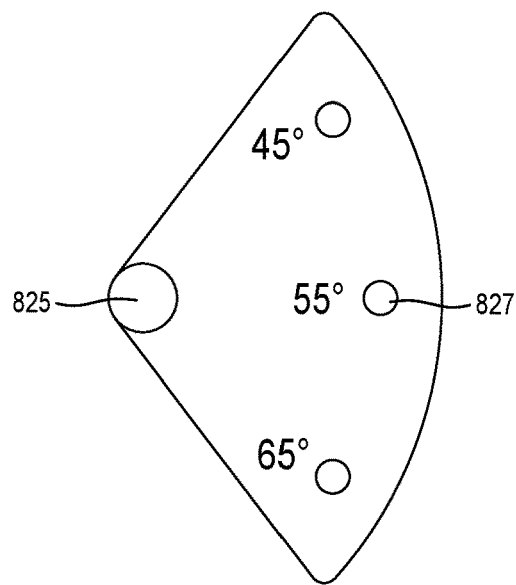
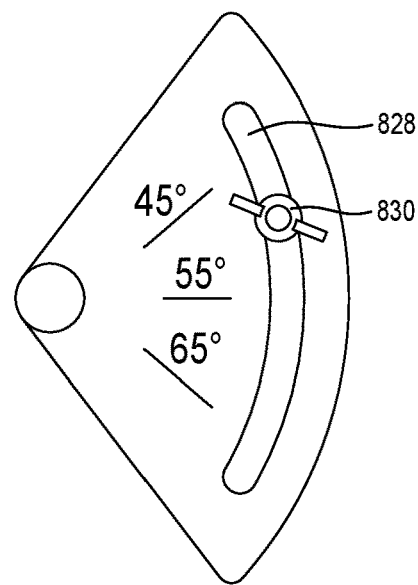
FIG. 12C
FIG. 12D

SILO GUARD

CROSS-REFERENCE TO RELATED APPLICATIONS

This application is a continuation of International Application No. PCT/AU2020/050019, filed Jan. 15, 2020, which claims priority to Australian Application No. 2019100045, filed Jan. 15, 2019, both of which are incorporated herein in their entireties.

TECHNICAL FIELD

The invention relates to the field of agricultural equipment. Specifically, the invention relates to a guard for a silo for reducing agglomeration of stored agricultural material.

BACKGROUND

Silos and storage containers in the agricultural industry are typically large and have capacity to store tonnes of agricultural material. Due to their size they are typically stored externally, wherein the contents of the silo are subject to broad temperature variations from day to night causing condensation and moisture to accumulate in the silo. This condensation combined with lengthy storage periods can lead the contents of the silo to become clumped or agglomerated, such that removing the stored material becomes difficult and time consuming. In some cases, the entire outlet can become blocked, or bridged by compacted agricultural material, in other cases a gradual build-up can accumulate around the edges of the silo forming a rathole through the agricultural material or a build-up around the mouth of the silo.

Presently, when a silo outlet or mouth becomes blocked with clumped materials, there is a propensity for nearby workers to use hand held tools and poles to try to induce the clumped material through the mouth of the silo. Also common, is for workers to enter the silo, through the manhole, in an attempt to dislodge and/or break-up clumped material from the inside of the silo. This can occur as part of a routine cleaning or maintenance or due to a build-up of agricultural material around the mouth of the silo. Where the silo is emptying directly into an auger or other agricultural machinery, this has led to the loss of limbs and the loss of life.

The present invention was conceived with these shortcomings in mind.

SUMMARY OF THE INVENTION

In broad terms, the invention provides a filter for a bin storing agricultural material, the filter comprising; a rigid perimeter frame, supporting a grate within the frame; and a plurality of legs spaced about the perimeter frame, wherein the filter, in use, is located within the bin and positioned to substantially cover an outlet of the bin, the plurality of legs in direct contact with the bin so as to transmit vibrations from the bin to the filter, the agricultural material within the bin traversing the grate as it exits the bin. The grate may be formed of a plate having a plurality of through apertures. The grate may be formed of a mesh comprising a plurality of line wires. The grate may be formed of a mesh comprising a plurality of line wires and a plurality of cross-wires.

In a further aspect, the invention provides a filter for a bin storing agricultural material, the filter comprising; a rigid perimeter frame, supporting a plurality of line wires within the frame; and a plurality of legs spaced about the perimeter frame, wherein the filter, in use, is located within the bin and positioned to substantially cover an outlet of the bin, the plurality of legs in direct contact with the bin so as to transmit vibrations from the bin to the filter, the agricultural material within the bin being forced through the grate of line wires as it exits the bin.

The rigid perimeter frame may comprise two portions, operably engageable with one another. The two portions of the perimeter frame may be disengagable from one another.

The two portions of the frame may be pivotally connected to one another. The pivotal connection may be a hinge.

Each frame portion may be dimensioned to be inserted into the bin or silo through a manhole or access port.

The two frame portions may be symmetrical. The two frame portions may be non-symmetrical.

The perimeter frame may be formed from a hollow section. The perimeter frame may be roll formed or extruded to provide a tri-lobed cross-section.

The plurality of line wires may be interleaved with a plurality of cross-wires to form a grate across the rigid perimeter frame.

The grate may be regular, configured to provide a regular mesh. The grate may be irregular, configured to provide an irregular mesh. The grate may provide a spacing of 25 mm between adjacent line wires. The grate may provide a spacing of 50 mm between adjacent line wires. The grate may provide a spacing of 75 mm between adjacent line wires. The grate may provide a spacing of 100 mm between adjacent line wires.

The plurality of legs may be inclined to a plane of the perimeter frame. The filter may be installed in the silo with zero gradient such that an operative plane of the filter is parallel to the outlet of the silo. The filter may be installed in the silo inclined to the walls of the silo. The plurality of legs may be adjustably mounted to the perimeter frame.

The perimeter frame may be made from any one of combination of the following: steel, aluminium, alloy, and iron. The filter may be coated with a water-proof coating. The filter may be powder coated or otherwise coated to reduce susceptibility to corrosion.

In some embodiments, the filter in its entirety, and in other embodiments just the perimeter frame and legs, may be galvanised, or gal dipped to provide protection to the filter. This coating may extend the usable life of the filter. In some embodiments, the filer is plastic coated. The plastic coating may be a recyclable plastic material. The plastic coating may increase the usable life of the filter. The coating may be selected to reduce friction on a surface of the filter, to further reduce agglomeration of agricultural material on or about the mesh and frame of the filter.

An intermediary mounting structure may be permanently engaged to the silo. The filter may be mounted to the intermediary mounting structure, to allow the frame portions to be removed and/or replaced at regular intervals.

In a still further aspect, the invention provides a silo or agricultural storage bin comprising the filter as described herein.

The frame may be formed from Hollow Structural Sections (HSS). In some embodiments the frame is formed from rolling Square Hollow Sections (SHS) to make a rolled hollow cross-section having an apex. Alternatively, the frame may be formed from rectangular hollow sections (RHS) and roll-formed to produce a tubular cross-section having an apex. Alternatively, the frame may be formed from circular hollow sections (CHS) and roll-formed to produce a tubular cross-section having an apex.

BRIEF DESCRIPTION OF THE DRAWINGS

Embodiments of the invention are illustrated by way of example, and not by way of limitation, with reference to the accompanying drawings, of which:

FIG. 12A is a perspective view of an adjustable leg mounted to the filter;

FIG. 12B illustrated a hinge for rotating the leg relative to the frame;

FIG. 12C illustrates a schematic view of a plurality of set points for adjusting the legs orientation relative to the frame; and FIG. 12D illustrated a fixing mechanism for locking the leg at desired angle relative to the frame.

Embodiments will now be described more fully hereinafter with reference to the accompanying drawings, in which various embodiments, although not the only possible embodiments, of the invention are shown. The invention may be embodied in many different forms and should not be construed as being limited to the embodiments described below.

DETAILED DESCRIPTION OF EMBODIMENTS

The term "agricultural material" is understood herein to refer to multiple products, some of a particulate nature like seeds and pellets, and also to products of a fibrous nature like fertiliser and manure. "Agricultural material" is also intended to encompass both edible and non-edible materials that require storage and/or distribution within a harvesting cycle; for example, seed, grains, beans, fertilizer, pellets, and the like.

Figure 1:
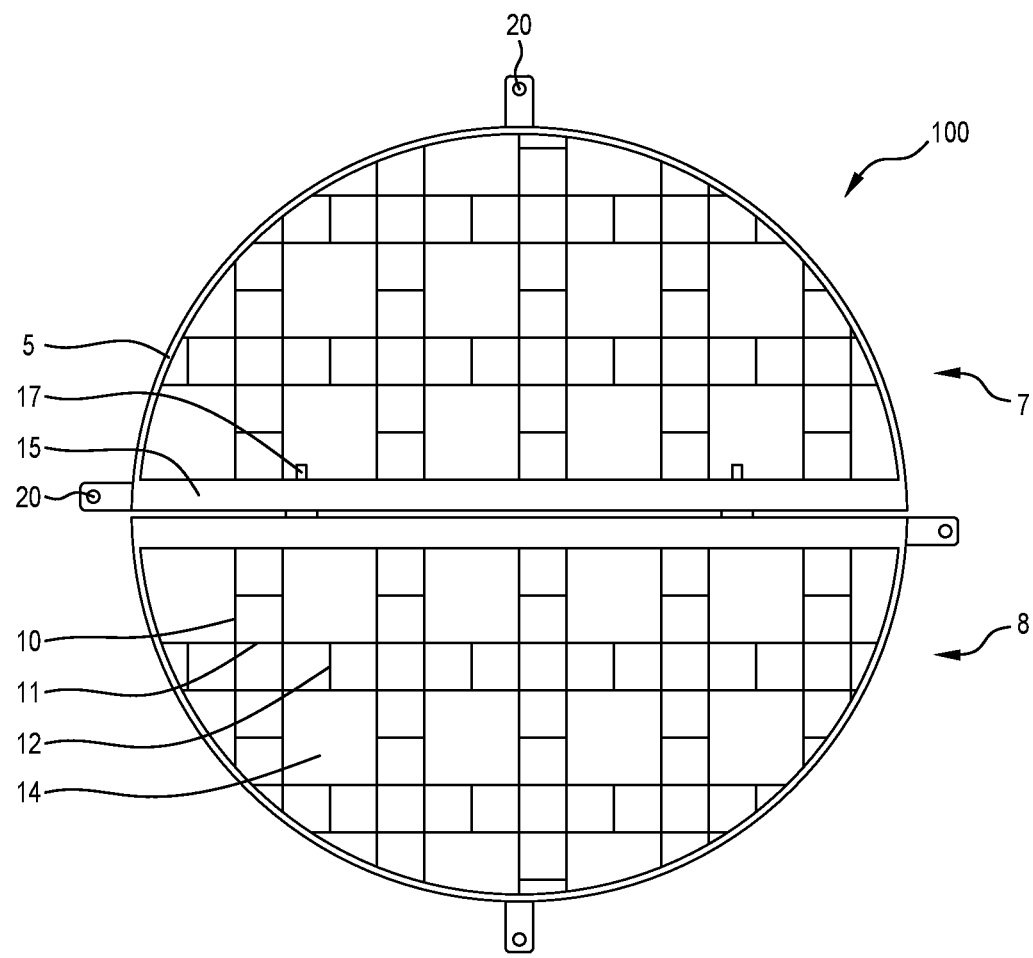
FIG. 1 is a top view of a filter according to an embodiment of the invention illustrating a grid configured to provide large and small square apertures.
Figure 2:
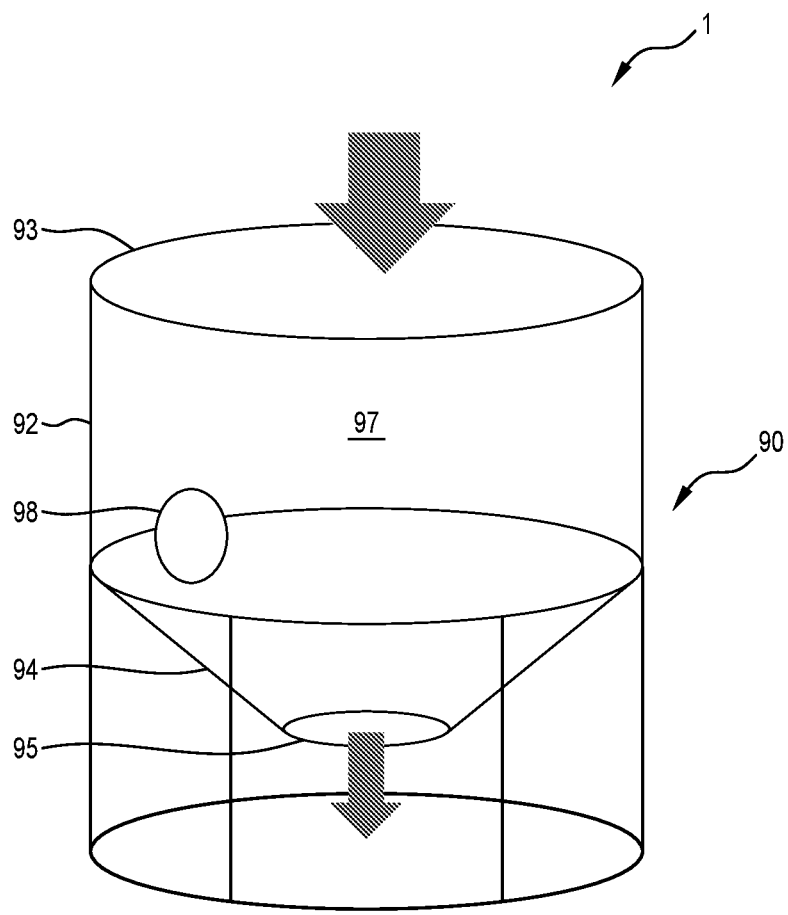
FIG. 2 is a schematic view of a silo, illustrating an outlet of the silo and a man-hole for ingress of a person into a cavity of the silo.

Described herein with reference to FIG. 1, there is illustrated a filter 100 for a bin or silo 1 storing agricultural material, the filter 100 comprising; a rigid perimeter frame 5, supporting a plurality of line wires 10 within the frame 5; and a plurality of legs 20 spaced about the perimeter, wherein the filter 100, in use, is located within the silo 1 and positioned to substantially cover an outlet 95 of the silo, the plurality of legs 20 in direct contact with the silo 1 so as to transmit vibrations from the silo 1 to the filter 100, the agricultural material within the silo 1 being forced through the plurality of line wires 10 as it exits the silo 1 to a secondary collector.

The silo 1 for storing the agricultural material, comprises a body 90 having a cylindrical upper wall 92, an inlet 93 for receiving agriculture material, and a conical lower wall 94 that forms a funnel that narrows to an outlet 95. The upper wall 92 and lower wall 94 together define a cavity 97 for storing the agriculture material (not illustrated). The body 90 further provides an access port or manhole 98 facilitating ingress and egress from the cavity 97 for a farmer.

A secondary collector is typically located under or adjacent to the outlet 95 for collecting and/or dispersing the agricultural material as it exits the outlet 95.

While the agricultural material travels through the silo 1 under the influence of gravitational force, this secondary collector will comprise an auger or alternative dispersal mechanism to move the agricultural material to a further storage or dispersal means, e.g. spreader, chaser bin or the like.

The filter 100 of FIG. 1 has a circular perimeter frame 5 that exceeds the size of the silo outlet 95. The filter 100 is configured to be located within the conical lower wall 94 of the silo 1, prior to filling of the silo 1. The filter 100 is positioned about 30 cm above the outlet 95. This location can be varied for different embodiments of the filter depending on the agricultural material to be stored.

Figure 5A:
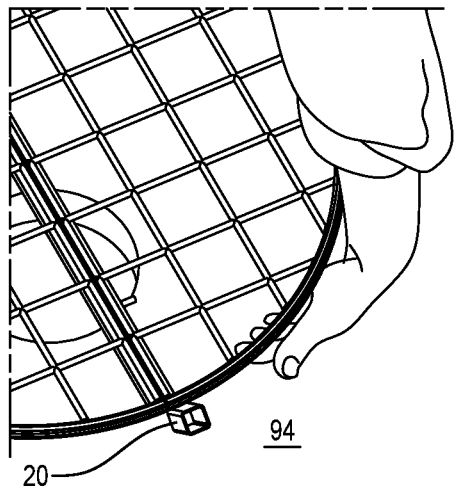
FIG. 5A is a perspective view of the filter in place across the outlet or mouth of the silo, illustrating a gap formed between the perimeter frame of the filter and an inner wall of the silo, by the legs of the filter.

The filter 100 comprises four legs 20, equidistantly spaced about the perimeter frame 5. These legs 20 are about 50-100 mm in length such that the mounted filter 100 sits above the outlet 95 providing a gap G between the conical lower wall 94 and the perimeter frame 5 for the escape of agricultural product (see FIG. 5A). The gap G prevent the binding or build-up of agricultural material about the lower conical wall 94 of the silo 1.

The legs 20 are about 50 mm×50 mm in cross-section. The legs 20 are formed as a rectangular prism, to allow agricultural material to flow therethrough. The legs 20 can be bolted, welded, glued or otherwise adhered to the perimeter frame 5. Two legs 20 can be used to support the filter 100 above the outlet of the silo 1. However, it was found that three legs 20 or four legs 20 or five legs 20 provide a more even load distribution across the filter 100 in use, and when supporting a farmer as a platform within the silo 1.

Depending on the desired location for the filter 100 within a silo 1, the legs 20 can be engaged to the perimeter frame 5 at an inclined angle, between 35-75 degrees, and ideally about 55 degrees. These inclined legs 20 will assist in seating the filter 100 against the conical lower wall 94 of the silo 1.

Each of the legs 20 comprises an aperture for receiving and retaining a mounting bolt 22 for securing the filter 100 in position within the silo 1.

The filter 100 of FIG. 1 is formed from two symmetrical portions 7, 8. The perimeter frame 5 comprising two D-shaped frames 5a, 5b engaged to one another to form a circular filter 100 (see FIG. 3C).

The filter 100 will have an overall diameter of between 700 mm-800 mm. This will sufficiently cover the outlet of a typical silo which ranges from between 200 mm-300 mm. However, it is contemplated that smaller and larger filters can be formed as embodiments of the invention for use on bespoke silos 1.

Each frame portion 5a, 5b is covered by a plurality of line wires 10. The line wires 10 of FIG. 1 are arranged to extend in two different, providing line wires 10 and cross-wires 11 in perpendicular directions to one another, to form a grid or grate 12 across the frame 5. The grate 12 creating a plurality of apertures 14 through the filter 100.

The grate 12 provides a lattice work of 100 mm×100 mm and 50 mm×50 mm squares. This lattice provides a fine filter for the agricultural material and further allows access for a tool to be pushed through the filter, if required. The size of the squares of the grate 12 can be varied. The 100 mm×100 mm is sufficient to allow tools to traverse the filter and a finger, but also sufficient to deter a farmer from traversing the filter with an arm or a leg. In practice it was found that a 50 mm×50 mm grate provided a finer and quicker flow of agricultural material from the silo 1. A 50×50 grate further prohibits limbs of a farmer from crossing the filter 100.

In further embodiments, grates as small as 25 mm×25 mm were also found to be effective providing a still finer ad quicker flow of agricultural material from the silo 1.

A central spine 15 is formed where the two straight portions of frames 5a, 5b converge. This spine 15 provides rigidity and strength to the filter 100, allowing it to be used as platform to support a famer inside the silo 1.

The spine 15 provides a pair of complementary fixings for engaging the two frame portions 5a,5b to each other. In one embodiment, each of the pair of complementary fixings comprises a bolt 17 and receiving hole 18 (or slot). A first frame portion 5a can comprise two bolts 17 or two holes 18, or one bolt 17 and one hole 18 (see FIG. 3B). In this manner the two portions of the filter 100 can be inserted into the silo 1 through either of the manhole 98 or the outlet 95 (see FIG. 4A) and subsequently configured to form the finished filter 100 once inside the cavity 97, illustrated in FIGS. 5A-5C.

Other methods of connecting the first and second portions 7, 8 of the filter together are also contemplated, for example, a tongue and groove connection, a stem and socket connection, a guide way and key, a dove tail to slidingly engage the portions 7 and 8 and complementary locking forms along the mating faces of the central spine 15.

Figure 3A:
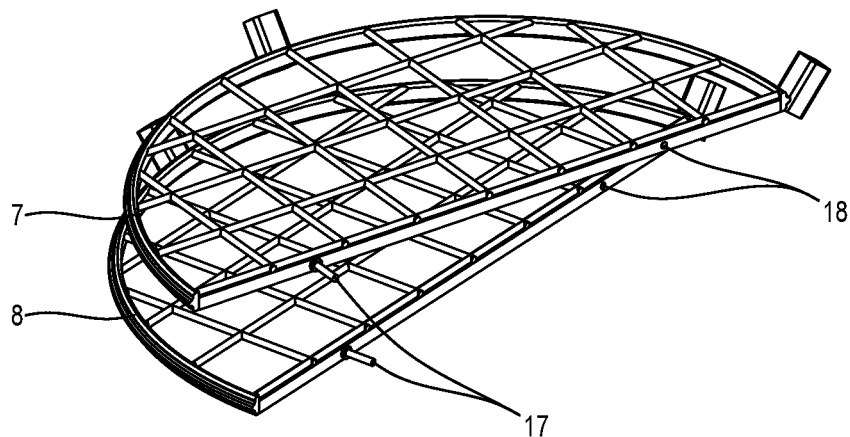
FIG. 3A is a perspective view of a filter according to one embodiment of the invention, the filter comprising two complementary portions configured to engage one another.

In some embodiments of the filter 100, the two fame portions 5a, 5b are separable and only bolted or screwed together once in the silo 1, illustrated in FIG. 3A. In some embodiments the central spine 15 is a hinge, allowing the two frame portions 5s, 5b to be permanently connected thereby allowing the filter 100 to fold along the spine for ease of ingress into the silo 1. Fixings may still be required along the spine 15 to hold the filter 100 in an unfolded configuration, once in place.

It is further contemplated that the filter 100 can be configured in more than two-portions, to facilitate ingress into the silo 1.

The perimeter frame 5 is formed from a hollow section. The hollow section can be formed by rolling or extruding a hollow metal section from steel or aluminium, or similarly ductile material. Illustrated in FIG. 4B is a cross-section of the perimeter frame 5 formed from a 1.6 mm gauge steel. The material gauge and grade can be varied to better suit the volume and nature of agricultural material to be stored in the silo 1. It is contemplated that a gauge of 1.0 mm, 1.2 mm, 1.4 mm, 1.8 mm or 2.0 mm may be used to form the perimeter frame 5.

The perimeter frame 5a illustrated in FIG. 4B, provides a cross-section having three lobes 18, 19, 21. The first 18 lobe and second lobe 19 are disposed on opposing sides of the frame 5 and an apex 21 (the third lobe) is centrally positioned between the first and second lobes 18, 19 and extends outwardly from the frame 5a. The apex 21 is bounded by two planar walls which provide weld faces that facilitate attachment of the legs 20 to the frame 5a.

The apex 21 extends around the entire perimeter of each of the two frame portions 7, 8. The tri-lobal cross-section is not continued through the straight portion of the frame portions 7, 8 to allow the two sides of the spine 15 to sit flush to one another.

Figure 4A:
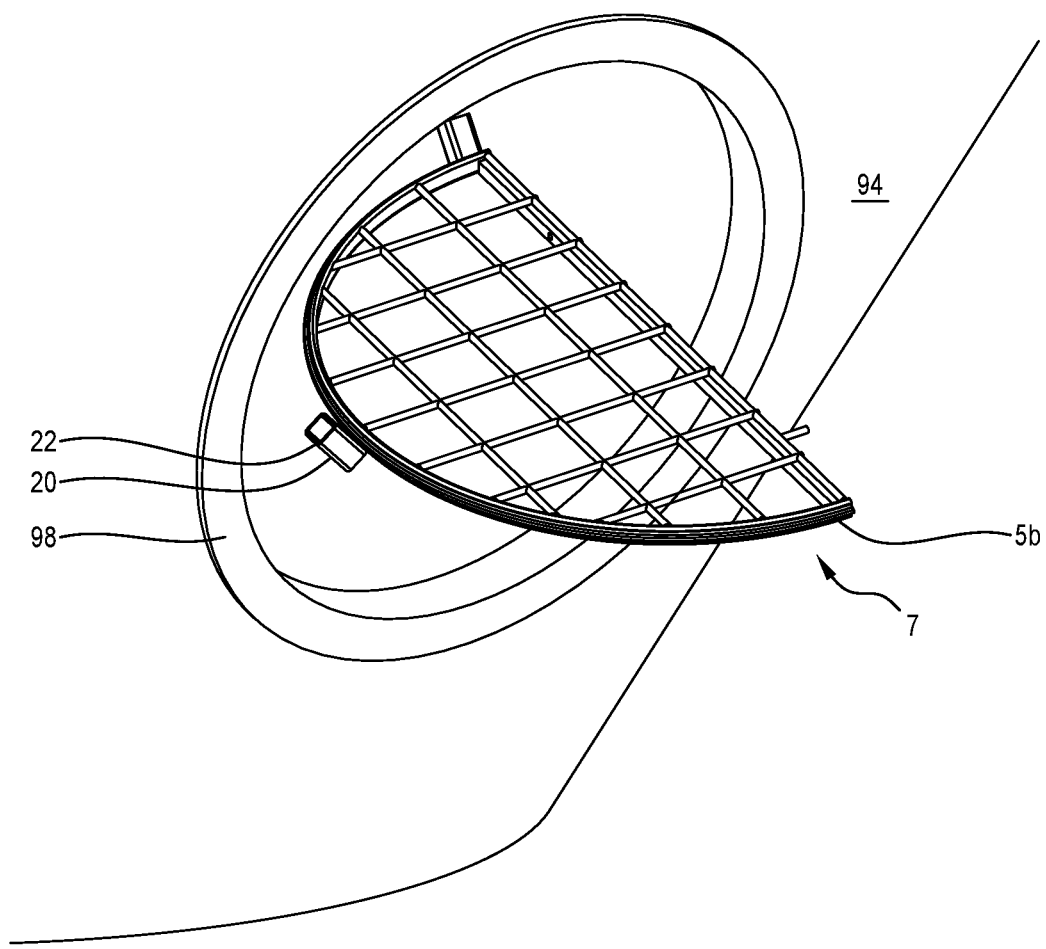
FIG. 4A is a perspective view of a first portion of the filter, being located within the cavity of the silo through a man-hole.
Figure 4B:
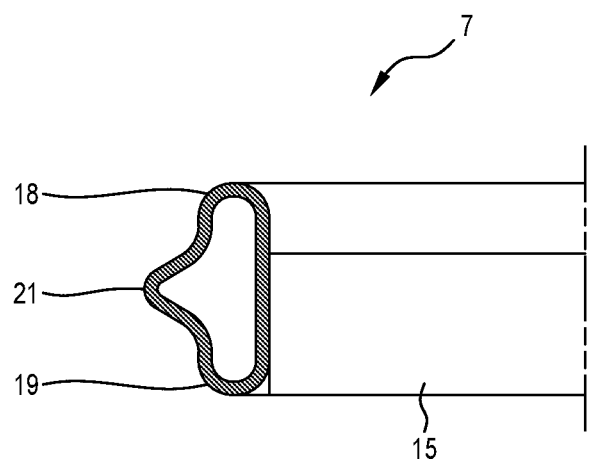
FIG. 4B is a sectional view of the perimeter frame of the filter of FIG. 4A, illustrating a rolled tubular cross-section having a central apex.
Figure 5B:
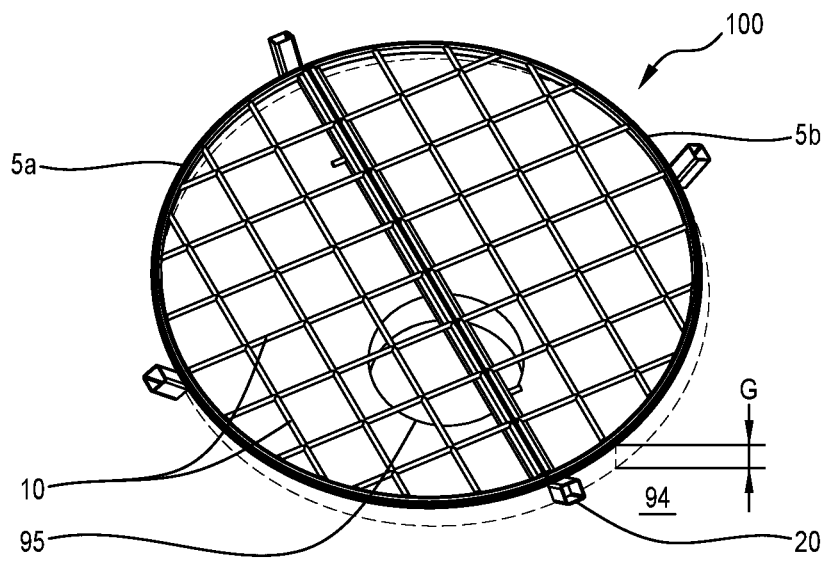
FIG. 5B is a perspective view of the filter in positions, covering the mouth of the silo from inside the silo.
Figure 5C:
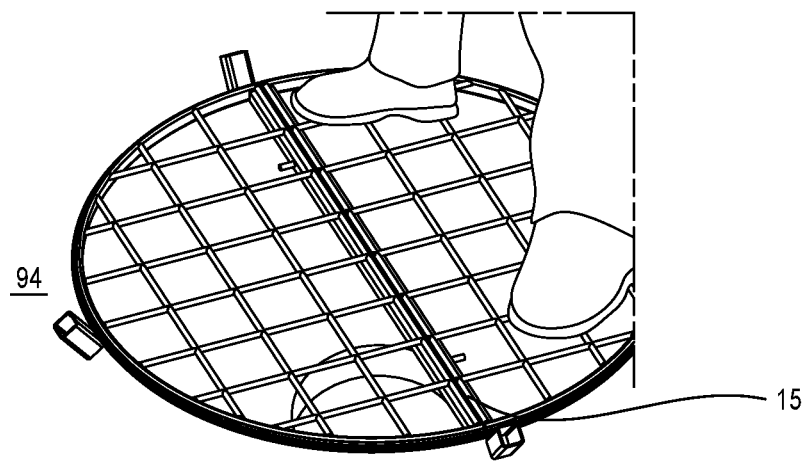
FIG. 5C is a perspective view of the filter, in use, as a support platform for a person in the silo.

To locate the filter 100, the two portions of the filter 7, 8 are inserted into the cavity 97 of the silo 1 as illustrated in FIG. 4A.

The perimeter frame 5 may be made from rolling SHS to make a rolled tubular cross-section to form an apex 21.

Figure 3B:
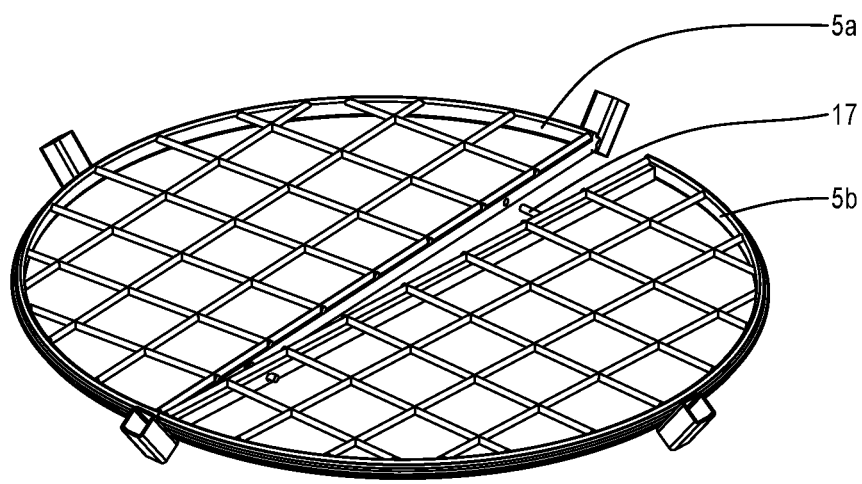
FIG. 3B is a top view of the two portions of the filter aligned for connection to one another.
Figure 3C:
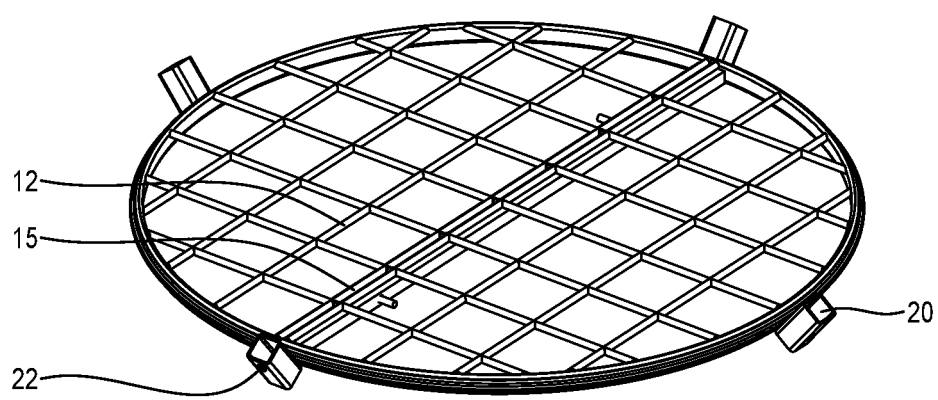
FIG. 3C is a perspective view of the filter of FIG. 3A, illustrating the two portions fully assembled.

The two portions of the filter 7, 8 are then engaged (or unfolded) to configure the operable filter 100, as illustrated in FIGS. 3B and 3C.

The filter 100 is levelled to sit about 300 mm above the outlet 95 leaving a perimeter gap G between the lower conical wall 94 and the perimeter frame 5. The bolts 22 are then driven through the lower conical wall 94 to permanently affix each of the legs 20 to the conical wall 94 and hold the filter 100 firmly in place, illustrated in FIG. 5B.

As agricultural material is introduced into the silo 1 through inlet 93, the weight of the agricultural material bears down on the grate 12 urging agricultural material in contact with the filter 100 to be forced through the line wires 10, producing a sieve-like effect.

The outlet 95 can be sealed by a door (not illustrated). When the outlet 95 is sealed the agricultural material within the silo 1 is susceptible to agglomerating or binding due to moisture in the agricultural material and temperature variations over the storage period. When the door is next opened the full weight of the agricultural material in the silo 1 is transferred from the door to the grate 12, initiating the sieve-like effect to allow the agricultural material to exit with an evenly dispersed discharge from the outlet 95 to the secondary collector.

Where the secondary collector comprises an auger or alternative dispersal machine to move agricultural material the vibrations of the auger/machine are transmitted to the lower conical wall 94 of the silo 1. These vibrations are further transmitted to the filter 100, which can amplify the vibrations and assist in breaking up the agricultural material within the silo 1. In combination the grate and the vibrations can assist in breaking up agglomerated agricultural material to help unify the flow of agricultural material exiting the outlet 95.

When the silo 1 is not in use, the filter 100 is sufficiently strong to provide an internal platform for a farmer to be supported upon. This can provide a safe working platform to allow the silo to be internally cleaned, as often required to prevent cross-contamination when changing over stored agricultural material within the silo 1.

Where the stored agricultural material is in pellet form a quick-sand effect can be experienced by a farmer with the silo, where the particulate material heading to the outlet 95 can drag a person towards the outlet and any awaiting machinery below the outlet. As such the filter 100 provides a platform for cleaning the silo walls and removing clag from the silo.

Figure 6A:
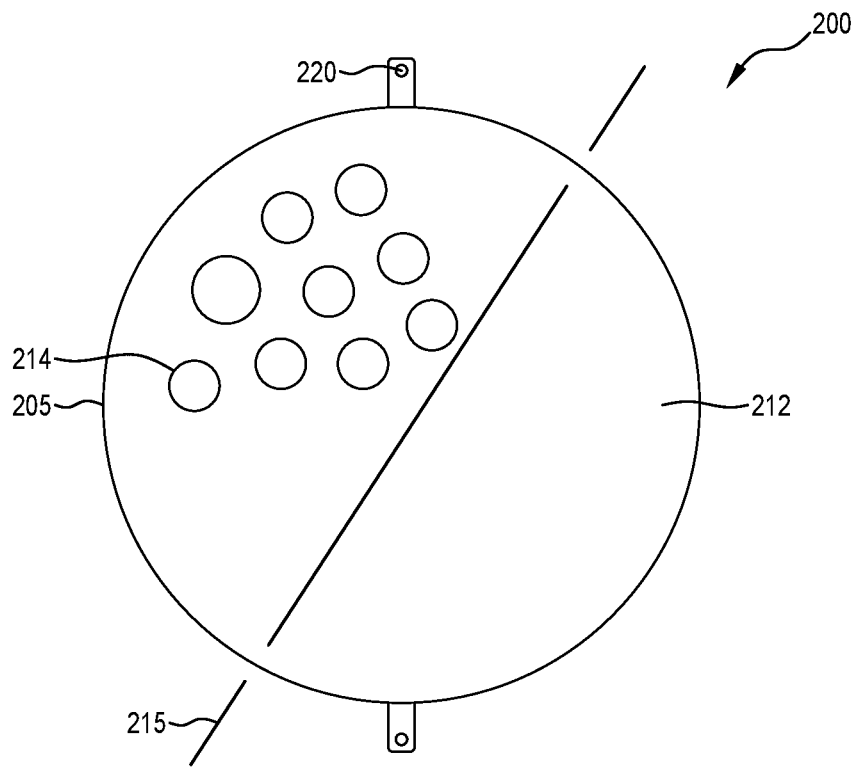
FIG. 6A is a plan view of one embodiment of the filter, where the filter is formed from a pressed plate, having a plurality of holes or perforations across a surface of the plate.

FIG. 6A illustrates an embodiment of the filter 200, where the grate 12 is formed by a stamped metal sheet, formed as a concave dish 212, protruding towards the outlet. The dish 212 provides a plurality of apertures 214 to allow agricultural material to flow through the filter 100.

The apertures 214 are sufficient to allow a rod or pole to traverse the filter 100 but not a limb of a farmer. The diameter of each of aperture 214 is about 50 mm-100 mm. The filter 200 is provided with two legs 220 and can be easily seated at the base of the conical lower wall 94, such that the dish conforms to the inclined walls of the silo 1. The filter 200 can be used as a platform but does not provide a level platform for supporting a farmer.

The filter 200 can be made in two portions with a central spine 215.

Figure 6B:
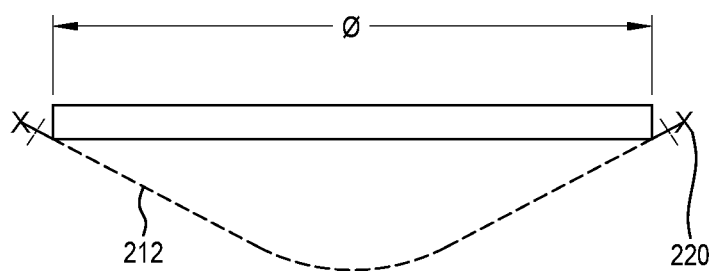
FIG. 6B is a side view of the filter of FIG. 6A, illustrating a dished profile that extends downwardly towards the outlet of the silo.

The filer 200 is illustrated in side view in FIG. 6B, having an overall diameter of between 700 mm-800 mm. The feet 220 are not hollow and are formed as tags that support the weight of the dish 212 against the conical wall 94 of the silo 1.

Figure 7A:
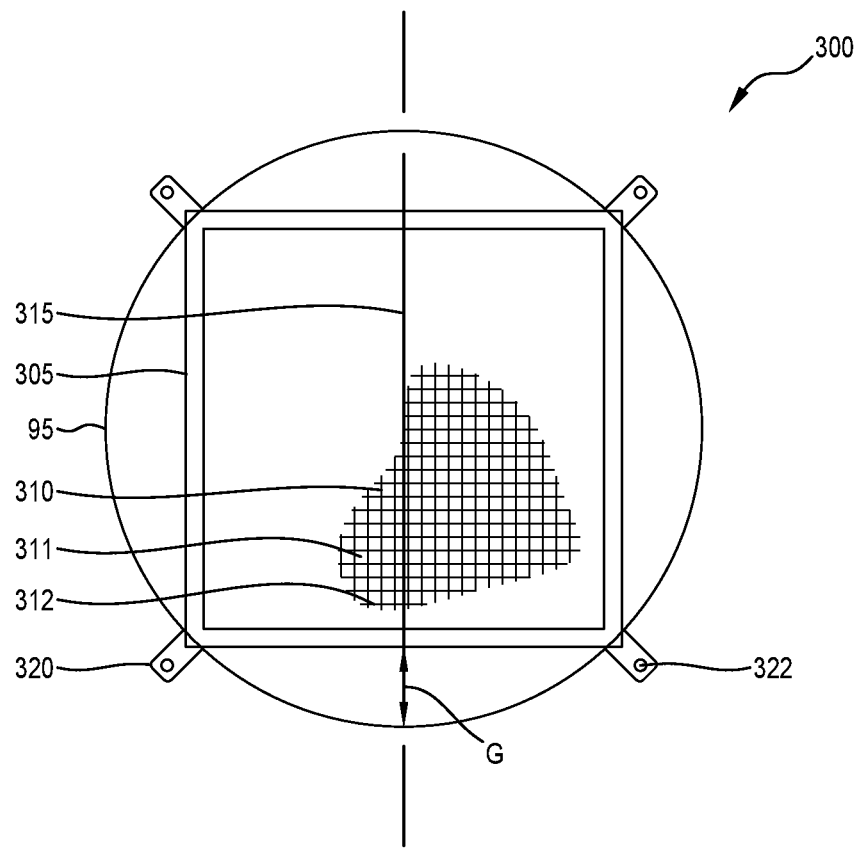
FIG. 7A is a plan view of one embodiment of the filter, where the filter is configured to have a square perimeter, having a grate of small wires extending across the frame.
Figure 7B:
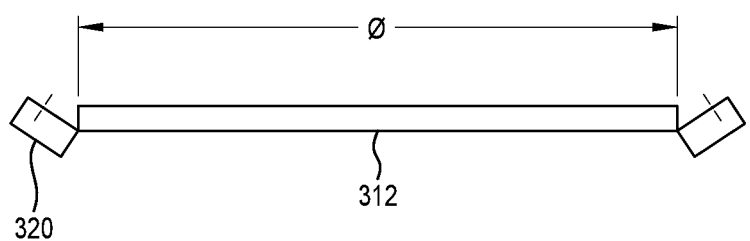
FIG. 7B is a side view of the filter of FIG. 7A, illustrating a flat profile to the perimeter frame and a pair of opposing legs positioned between the frame and the outlet of the silo, inclined to conform to the inclined inner wall of the silo.

FIGS. 7A and 7B illustrate an embodiment of the filter 300, configured to have a square perimeter frame 305 that is smaller than the outlet 95. The filter 300 is placed approximately centrally above the outlet 95, greatly increasing the gap G between the perimeter frame 305 and the conical walls 94 of the silo 1.

The filter 300 can be made in two portions with a central spine 315.

Four legs 320 are located at the corners of the perimeter frame 305 to hold the filter 100 off the lower wall 94 of the silo 1. Similar to legs 20 described above, the legs 320 are hollow and are engaged at an incline to the frame 305 to better conform with the conical lower wall 94.

A grate 312 of line wires 310 and cross-wires 311 extend across the perimeter frame 305. The line wires 310 being spaced between 50-100 mm from each other in a lattice configuration.

Figure 8A:
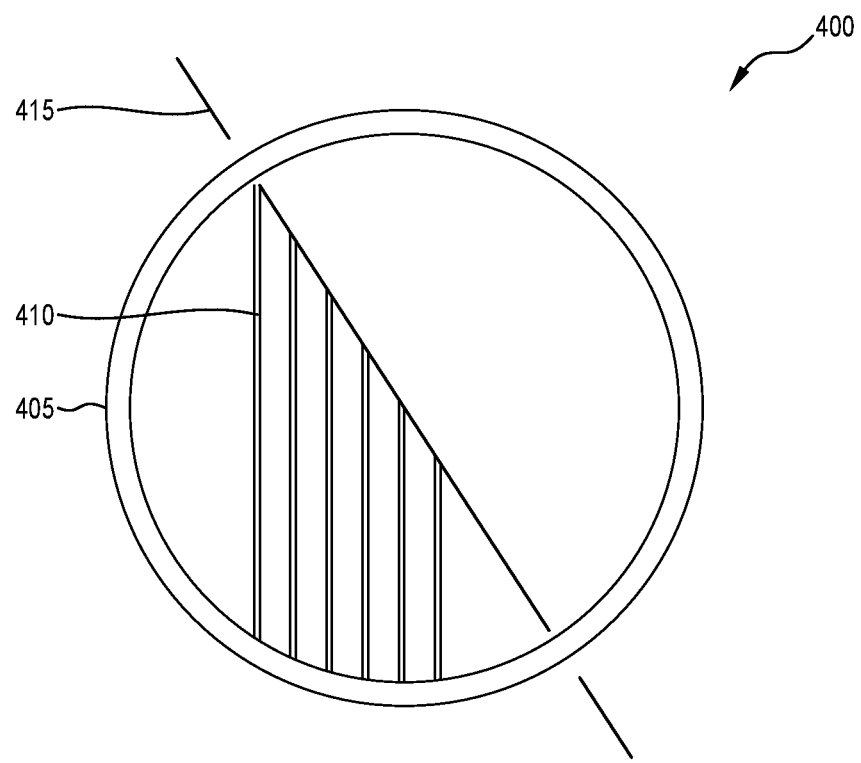
FIG. 8A is a plan view of one embodiment of the filter, where the filter is configured to have a circular perimeter, having a plurality of parallel bars extending across the frame.
Figure 8B:
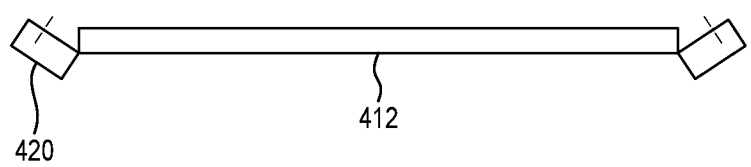
FIG. 8B is a side view of the filter of FIG. 8A, illustrating a flat profile to the perimeter frame and a pair of opposing legs extending above the frame on an opposing side to the outlet of the silo, the legs inclined to conform to the inclined inner wall of the silo.

FIGS. 8A and 8B illustrate an embodiment of the filter 400, configured to have a circular perimeter frame 405 that exceeds the diameter of the outlet 95. The filter 400 is placed approximately centrally above the outlet 95, providing a small gap G between the perimeter frame 405 and the conical walls 94 of the silo 1.

Two, three or four legs 420 are evenly spaced around the perimeter frame 405 to hold the filter 400 off the lower wall 94 of the silo 1. Similar to legs 20 described above, the legs 320 are hollow and are engaged at an incline to the frame 405 to better conform with the conical lower wall 94.

A grate 412 of line wires 410 extends across the perimeter frame 405. The line wires 410 being parallel, evenly spaced bars extending across the frame 405. The bars 410 are spaced apart between 30 mm-100 mm from each other. The bars 410 can be formed to have a circular, or rectangular cross-section.

Figure 9:
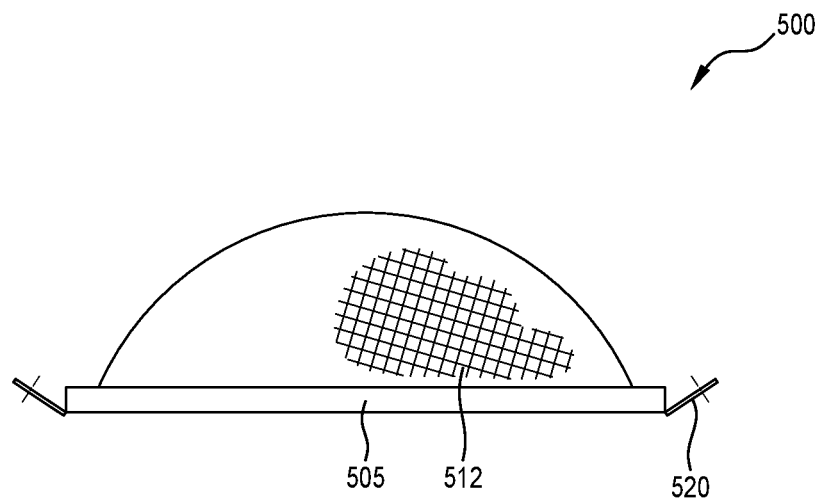
FIG. 9 is a side view of one embodiment of the filter, where the filter is configured as a dome, having a mesh of line wires and intersecting cross-wires.

FIG. 9 illustrates an embodiment of the filter 500, configured to have a circular perimeter frame 505 that exceeds the diameter of the outlet 95. The filter 500 is placed approximately centrally above the outlet 95, providing a small gap G between the perimeter frame 505 and the conical walls 94 of the silo 1.

Two, three or four legs 520 are evenly spaced around the perimeter frame 405 to hold the filter 400 off the lower wall 94 of the silo 1. Similar to legs 20 described above, the legs 520 are hollow and are engaged at an incline to the frame 405 to better conform with the conical lower wall 94.

The filter 500 is configured as an upwardly projecting dome, that is projecting away from the outlet 95. The grate 512 of line wires 510 and cross-wires 511 extends across the perimeter frame 505 forming the dome of the filter 500.

Figure 10A:
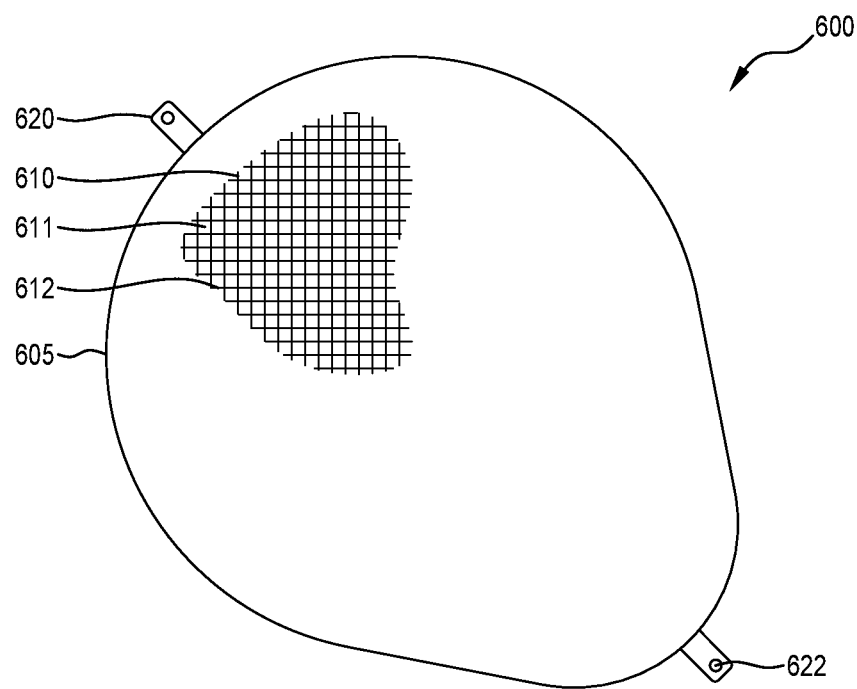
FIG. 10A is a plan view of one embodiment of the filter, where the filter is non-symmetrical for use in silos having an off-set outlet.
Figure 10B:
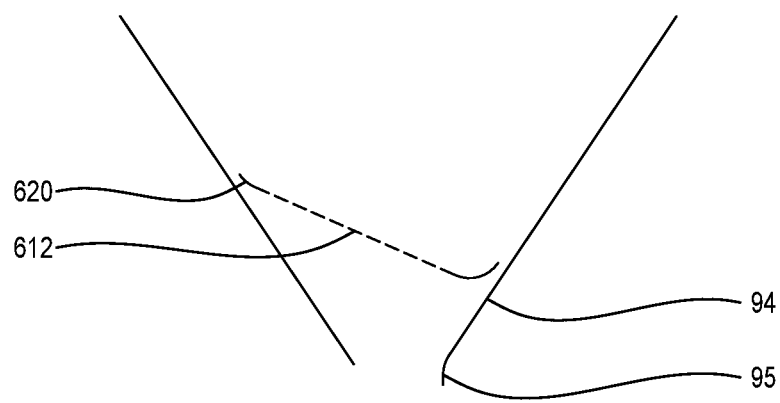
FIG. 10B is a side view of the filter of FIG. 10A, illustrating an inclined mounting configuration within a conical portion of the silo adjacent the outlet.

FIGS. 10A and 10B illustrate an embodiment of the filter 600, configured to have a pear-shaped perimeter frame 605 that greatly exceeds the diameter of the outlet 95. The filter 600 is placed approximately above the outlet 95 and is inclined with the conical walls 94 of the silo 1. This filter 600 can also be utilised in silos 1 where the conical walls 94 are not symmetrical and the funnel of the silo is offset. The filter 600 can also be formed in two-portions for ease of ingress into the silo 1.

Two legs 620 are disposed around the perimeter frame 605 to hold the filter 600 off the lower wall 94 of the silo 1. Similar to legs 20 described above, the legs 620 are hollow and are engaged at an incline to the frame 605 to better conform with the conical lower wall 94.

A grate 612 of line wires 610 and cross-wires 611 extends across the perimeter frame 605. The line wires 610 and cross-wires 610 of the grate 612 forming a lattice spaced apart between 50 mm-100 mm from each other.

Figure 11A:
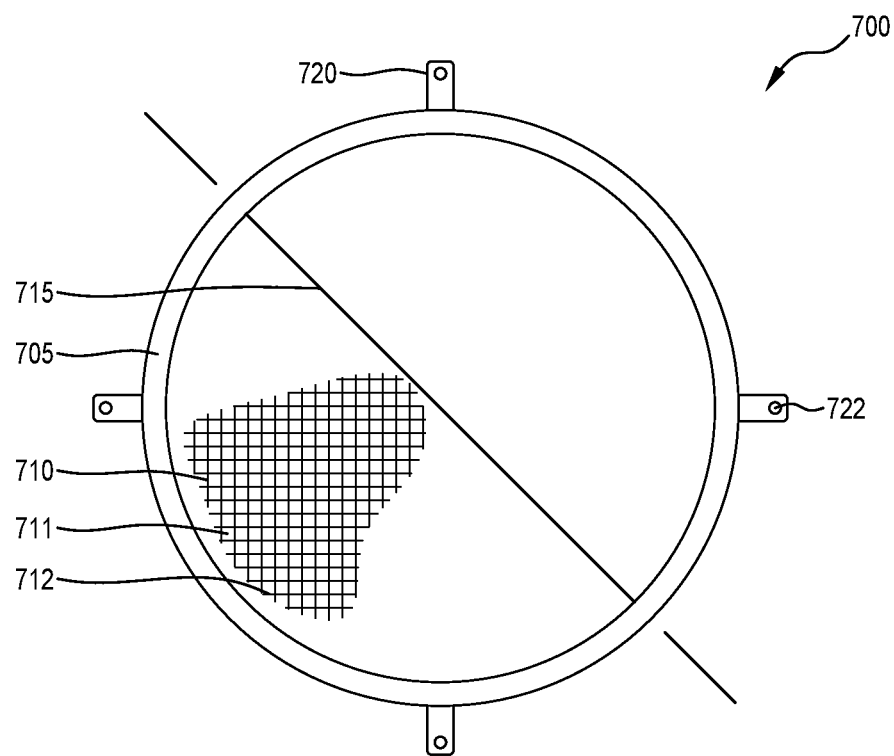
FIG. 11A is a plan view of one embodiment of the filter, illustrating a fine mesh of line wires and intersecting cross-wires across the frame of the filter.
Figure 11B:
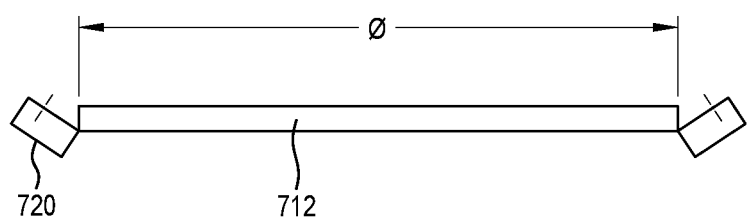
FIG. 11B is a side view of the filter of FIG. 11A, illustrating a flat plane of the filter and a perimeter frame having a rounded cross-section.

FIGS. 11A and 11B illustrate an embodiment of the filter 700, configured to have a circular perimeter frame 705 that exceeds the diameter of the outlet 95 and sits snugly against the lower conical wall 94 of the silo 1. The filter 700 is placed approximately centrally above the outlet 95, providing almost no gap G between the perimeter frame 705 and the conical walls 94 of the silo 1.

The filter 700 can be made in two portions with a central spine 715.

Two, three or four legs 720 are evenly spaced around the perimeter frame 705 to hold the filter 700 off the lower wall 94 of the silo 1. The legs 720 can be hollow or be formed as tags from which the filter 700 hangs. As there is no gap G envisaged in this embodiment of the filter, the need for hollow legs is redundant.

A grate 712 of line wires 710 and cross-wires 711 extends across the perimeter frame 705. The line wires 710 and cross-wires 711 of the grate forming a lattice spaced apart between 50 mm-100 mm from each other.

In the market, that are a large number of silo 1 configurations and there is huge variation in the inclination angles of the cones of these silos. With this in mind, some embodiments of the filter 100 provide the ability to adjust the orientation of the legs 20 against the frame 5 provides for further tailoring of the filter 100, and ease of installation.

In some embodiments, illustrated in FIGS. 12A-12D, the legs 820 are configured to be adjustable. A pair of identical mounting brackets 823 are permanently affixed to the fame 5 either by welding or alternative mounting means. Each of the legs 820 is provided with an axle 825 for pivoting about. The axle 825 can be a welded bar across an outer portion of the leg 820 or a pair of coaxially aligned stub axles to define the pivot axle 825. The leg 820 is thus movably mounted to the pair of mounting brackets 823 to allow the leg 820 to pivot relative to the frame 5, providing a hinge 826 for each leg 820 (see FIG. 12B).

In one embodiment the mounting brackets 823 are provided with a series of discrete holes 827 for locking the legs 820 are a predetermined angle relative to the frame 5 (see FIG. 12C). This allows the legs 820 to be rotated relative to the frame 5 and locked in a predetermined orientation for example, 35 degrees, 45 degrees, 55 degrees, 65 degrees and so on. Once adjusted, the legs 820 better conform to the shape and wall inclination of the silo 1.

In one embodiment (see FIG. 12D) the pair of brackets 823 each have an arcuate slot 828 for locking the legs 820 at a plurality of angles relative to the frame 5. This then allows the legs 820 to be adjusted to better conform to the shape and wall inclination of the silo 1. Having an arcuate slot 828 further allows the legs to compensate for any tolerance issues in the wall of the silo, as the legs 820 can be adjusted through infinite degrees of rotation, allowing them to be levelled against the silo 1 in situ. The slot 828 of FIG. 12D provides a scale on an outer face, to read and set the desired angle of inclination of each leg 820.

Each of the legs 820, as well as providing an axle 825 for mounting to the bracket 823, also provides at least one protrusion 829, that extends from a side wall of the leg 820 to thereby engage with the arcuate slot 828 or the discrete holes 827 of the mounting brackets 832. In some embodiments the protrusions 829 are threaded and can be posted through the slot or holes in the brackets 823 to then be locked in place against the mounting brackets 823 with a wing nut 830 or similar threaded fastener. A pair of protrusions 829 can extend from opposing sides of the leg 820 to be received, respectively by each of the pair of mounting brackets 823.

The threaded protrusions 829 are welded or otherwise permanently affixed to the leg 820 and as the leg is pivoted the threaded protrusions 829 can then be locked in position using the wing nut 830.

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

| LEGEND | |
|---|---|
| No. | |
| 1 | Silo |
| 2 | |
| 4 | |
| 5 | Perimeter frame |
| 5a | First frame portion |
| 5b | Second frame portion |
| 7 | First filter portion |
| 8 | Second filter portion |
| 9 | |
| 10 | Line wires |
| 11 | Cross-wires |
| 12 | Grate/lattice |
| 13 | |
| 14 | Apertures |
| 15 | Spine |
| 17 | Centre bolt |
| 18 | Centre hole/slot |
| 19 | First lobe |
| 20 | Apex (third lobe) |
| 21 | Second lobe |
| 22 | |
| 23 | Leg mounting brackets |
| 24 | |
| 25 | Axle |
| 26 | Hinge |
| 27 | Discrete holes |
| 28 | Arcuate slot |
| 29 | Threaded protrusion |
| 30 | Fastener |
| 90 | Silo body |
| 91 | |
| 92 | Upper wall |
| 93 | Inlet |
| 94 | Lower wall |
| 95 | Outlet |
| 96 | |
| 97 | Cavity |
| 98 | Manhole |
| 99 | |
| 100 | Filter |

The invention claimed is:

1. A filter for a bin storing agricultural material, the filter comprising;
a rigid perimeter frame supporting a grate within the frame, the grate having a plurality of apertures through which the agricultural material is flowable when the filter is located in the bin; and
a plurality of legs spaced about the perimeter frame for securing the perimeter frame to the bin, with the plurality of legs being configured to directly contact the bin and to transmit vibrations from the bin to the filter; wherein the filter, in use, is located within the bin and positioned substantially above an outlet thereof with the legs directly contacting the bin, such that the agricultural material within the bin traverses through the apertures of the grate as it exits the bin through the outlet, the filter thereby serving as a sieve to reduce agglomeration of the dispensed agricultural material.

2. The filter of claim 1, wherein the perimeter frame comprises two portions operably engageable with one another.

3. The filter of claim 2, wherein the portions are pivotably connected to one another via a hinge.

4. The filter of claim 3, wherein, when the perimeter frame portions are folded about the hinge, the filter is insertable into the bin via the outlet.

5. The filter of claim 1, wherein the grate comprises a plurality of line wires interleaved with a plurality of cross-wires across the rigid perimeter frame, the plurality of line wires and plurality of cross-wires together defining the apertures of the grate.

6. The filter of claim 1, wherein the plurality of legs is adjustably mounted to the perimeter frame.

7. A silo or agricultural storage bin defining a cavity for storing material therein, comprising the filter of claim 1 positioned so that the legs directly contact a side wall of the bin.

8. The bin of claim 7, wherein the filter is configured as a platform to support a person standing thereon, within the cavity of the bin.

9. The filter of claim 1, wherein the perimeter frame substantially conforms to an internal cross-section of the bin.

10. The filter of claim 1, wherein the perimeter frame is formed from an extruded section having a profile that includes a central apex that extends around an entire perimeter thereof.

11. The filter of claim 1, wherein the perimeter frame has a diameter larger than that of the outlet.

12. The filter of claim 1, wherein the plurality of legs is configured to fixedly connect the filter to a side wall of the bin.

13. The filter of claim 12, wherein the plurality of legs is adapted to receive and retain a mounting bolt to secure the filter in position within the bin.

14. The filter of claim 1, wherein each of the plurality of legs extend from the perimeter frame at an inclined angle relative to the grate.

15. A method of installing the filter of claim 1, including the steps of:
inserting the filter into the bin through the outlet; and
fixedly securing the plurality of legs to the bin.

16. A filter for a bin storing agricultural material, the filter comprising:
a rigid perimeter frame supporting a grate within the frame, the grate having a plurality of apertures through which the agricultural material is flowable when the filter is located in the bin; and
a plurality of legs spaced about the perimeter frame for securing the perimeter frame to the bin, with the plurality of legs being configured to directly contact the bin and to transmit vibrations from the bin to the filter;
wherein the filter is configured to be inserted into the bin via an outlet located at a bottom thereof, the filter having a first configuration in which the filter can pass through the outlet and a second configuration in which the filter is sized to cover the outlet and will not pass therethrough;
wherein the filter, in use, is located within the bin and positioned in the second configuration substantially above the outlet with the legs directly contacting the bin, such that the agricultural material within the bin traverses through the apertures of the grate as it exits the bin through the outlet, the filter thereby serving as a sieve to reduce agglomeration of the dispensed agricultural material.

* * * * *